(12) United States Patent
Hera

(10) Patent No.: US 9,311,910 B2
(45) Date of Patent: Apr. 12, 2016

(54) VEHICLE ENGINE SOUND ENHANCEMENT

(71) Applicant: Bose Corporation, Framingham, MA (US)

(72) Inventor: Cristian M. Hera, Framingham, MA (US)

(73) Assignee: Bose Corporation, Framingham, MA (US)

( * ) Notice: Subject to any disclaimer, the term of this patent is extended or adjusted under 35 U.S.C. 154(b) by 169 days.

(21) Appl. No.: 14/228,571

(22) Filed: Mar. 28, 2014

(65) Prior Publication Data

US 2015/0279346 A1      Oct. 1, 2015

(51) Int. Cl.
| | |
|---|---|
| *G10K 11/18* | (2006.01) |
| *G10K 15/02* | (2006.01) |
| *B60Q 5/00* | (2006.01) |

(52) U.S. Cl.
CPC ..... *G10K 11/18* (2013.01); *B60Q 5/00* (2013.01); *G10K 15/02* (2013.01)

(58) Field of Classification Search
CPC ....... G10K 11/18; G10K 15/02; A63H 17/34; B60Q 5/00; B60Q 5/008; H03G 3/20
USPC ..................... 381/61, 86, 104, 107
See application file for complete search history.

(56) References Cited

U.S. PATENT DOCUMENTS

| | | | | |
|---|---|---|---|---|
| 5,635,903 A * | 6/1997 | Koike | ..................... | A63H 17/34 340/384.1 |
| 7,394,906 B2 * | 7/2008 | Jun | ......................... | H03G 3/32 381/104 |
| 7,787,633 B2 * | 8/2010 | Costello | ................... | G09B 9/02 340/384.3 |
| 8,130,974 B2 * | 3/2012 | Sakamoto | ................. | H04S 3/00 381/104 |
| 8,320,581 B2 | 11/2012 | Hera et al. | | |
| 2005/0169484 A1 * | 8/2005 | Cascone | ................... | H04R 5/02 381/61 |
| 2005/0213776 A1 * | 9/2005 | Honji | ...................... | H03G 5/165 381/86 |
| 2011/0085674 A1 | 4/2011 | Fujikawa | | |
| 2012/0177214 A1 | 7/2012 | Hera et al. | | |
| 2013/0259259 A1 | 10/2013 | Hera | | |

FOREIGN PATENT DOCUMENTS

| | | |
|---|---|---|
| FR | 2985238 A1 | 7/2013 |
| WO | 2011132347 A1 | 10/2011 |

OTHER PUBLICATIONS

International Search Report and Written Opinion dated Jun. 18, 2015 for International application No. PCT/US2015/022235.

* cited by examiner

*Primary Examiner* — Vivian Chin
*Assistant Examiner* — Jason R Kurr
(74) *Attorney, Agent, or Firm* — Bose Corporation

(57) ABSTRACT

A method includes providing a fundamental frequency corresponding to the RPM of an engine of a vehicle; determining a plurality of harmonics of the fundamental frequency; and determining a target shape of the plurality of harmonics. The target shape includes, for each of the harmonics of the plurality of the harmonics, a gain value as a function of the RPM of the engine. The method also includes determining an accelerator pedal position (APP) based gain that includes a gain value as a function of an accelerator pedal position; and determining a speed based gain that includes a gain value as a function of a difference between a set maximum speed and a measured vehicle speed. The method further includes combining the plurality of harmonics, the target shape of the plurality of harmonics, the APP based gain, and the speed based gain to produce a set of engine harmonic enhancement signals.

20 Claims, 9 Drawing Sheets

VEHICLE ENGINE SOUND ENHANCEMENT

BACKGROUND

This disclosure relates to vehicle engine sound enhancement and related methods and systems.

Some vehicles are equipped with engine sound enhancement systems, which enhance engine noise heard by a vehicle operator by reproducing gain adjusted versions of harmonic signals, representative of the harmonics of the engine rotation frequency, through an audio system in a cabin of the vehicle. Known engine sound enhancement systems adjust the level of enhancement (gain) applied to the harmonic signals based on parameters that correlate with the engine load.

Another feature that is available on some vehicles is a speed limiter, which allows a vehicle operator to set a maximum speed of the vehicle, e.g., to avoid exceeding a posted legal speed limit. Once a speed limit is set, the vehicle will not exceed that speed limit. Generally, the speed limiter function will be disabled if the vehicle operator turns it off, or if the vehicle operator floors the accelerator pedal.

SUMMARY

In a vehicle equipped with both a speed limiter and an engine sound enhancement system that is controlled by accelerator pedal position (APP), the APP will not change the engine state once the vehicle speed reaches the maximum speed set via the speed limiter. To prevent the engine sound enhancement system from changing the sound in response to a change in accelerator pedal position when there is no change in the engine state, a counter measure is provided which reduces a level of enhancement as the vehicle speed approaches the set maximum speed, and, in most cases, reduces it to no enhancement when the vehicle reaches the set maximum speed.

All examples and features mentioned below can be combined in any technically possible way.

One aspect features a method that includes providing a fundamental frequency corresponding to the RPM of an engine of a vehicle; determining a plurality of harmonics of the fundamental frequency; and determining a target shape of the plurality of harmonics. The target shape includes, for each of the harmonics of the plurality of the harmonics, a gain value as a function of the RPM of the engine. The method also includes determining an accelerator pedal position (APP) based gain that includes a gain value as a function of an accelerator pedal position; and determining a speed based gain that includes a gain value as a function of a difference between a set maximum speed and a measured vehicle speed. The method further includes combining the plurality of harmonics, the target shape of the plurality of harmonics, the APP based gain, and the speed based gain to produce a set of engine harmonic enhancement signals.

Implementations may include one of the following features, or any combination thereof.

In some implementations, the step of determining an APP based gain includes separately determining an APP based gain for each harmonic.

In certain implementations, the step of determining a speed based gain includes separately determining a speed based gain for each harmonic.

In some cases, the step of determining a speed based gain includes determining a norm of the difference between the set speed limit and the measured vehicle speed.

In certain cases, the norm of the difference between the set speed limit and the measured vehicle speed is determined according to:

$$\Delta V = \frac{V_{max} - V_{measured}}{V_{max}}$$

where,
$\Delta V$ is the norm of the difference between the set speed limit and the measured vehicle speed;
$V_{max}$ is the set maximum vehicle speed; and
$V_{measured}$ is the measured vehicle speed.

In some examples, the speed based gain increases as the norm of the difference between the set maximum speed and the measured vehicle speed increases.

In certain examples, the speed based gain increases as the difference between the set maximum speed and the measured vehicle speed increases.

In some implementations, the speed based gain decreases as the difference between the set maximum speed and the measured vehicle speed decreases, and, such that, no engine harmonic enhancement is provided when the measured vehicle speed is equal to the set maximum speed.

In certain implementations, the method also includes, in a vehicle sound system, transducing the engine harmonic enhancement signals to acoustic energy thereby to produce an engine sound within a passenger cabin of a vehicle.

In another aspect, a system includes circuitry for providing a fundamental frequency corresponding to the RPM of the engine; circuitry for determining a plurality of harmonics of the fundamental frequency; and circuitry for determining a target shape of the plurality of harmonics. The target shape includes, for each of the harmonics of the plurality of the harmonics, a gain value as a function of the RPM of the engine. The system also includes circuitry for determining an accelerator pedal position (APP) based gain that includes a gain value as a function of an accelerator pedal position; and circuitry for determining a speed based gain that includes a gain value as a function of a difference between a set maximum speed and a measured vehicle speed. The system further includes circuitry for combining the plurality of harmonics, the target shape of the plurality of harmonics, the engine harmonic enhancement gain, and the engine harmonic enhancement modification gain to produce a set of harmonic enhancement signals.

Implementations may include one of the above and/or below features, or any combination thereof.

In some implementations, the circuitry for determining an APP based gain includes circuitry for separately determining an APP based gain for each harmonic.

In certain implementations, the circuitry for determining a speed based gain includes circuitry for separately determining a speed based gain for each harmonic.

In some cases, the circuitry for determining the speed based gain is configured to determine the speed based gain by determining a norm of the difference between the set maximum speed and the measured vehicle speed, and mapping the norm to a gain value.

Another aspect features a method that includes providing a fundamental frequency corresponding to the RPM of an engine of a vehicle; determining a plurality of harmonics of the fundamental frequency; and determining a target shape of the plurality of harmonics. The target shape including, for each of the harmonics of the plurality of the harmonics, a gain value as a function of the RPM of the engine. The method also includes determining a speed based gain that includes a gain value as a function of a difference between a set maximum speed and a measured vehicle speed; and determining an engine harmonic enhancement (EHE) gain that includes a gain value as a function of an accelerator pedal position and the speed based gain. The method further includes combining the plurality of harmonics, the target shape of the plurality of harmonics, and the EHE gain to produce a set of engine harmonic enhancement signals.

Implementations may include one of the above and/or below features, or any combination thereof.

In some implementations, the method also includes determining at least one additional vehicle parameter based gain that includes a gain value as a function of an additional vehicle parameter, and the EHE based gain includes a gain value as a function of the accelerator pedal position, the speed based gain, and the at least one additional vehicle parameter based gain.

In certain implementations, the additional vehicle parameter based gain is selected from the group consisting of a gear that the vehicle is operating in, a rate of change in engine RPM (ΔRPM), and a driving mode that the vehicle is operating in.

DETAILED DESCRIPTION

Figure 1:
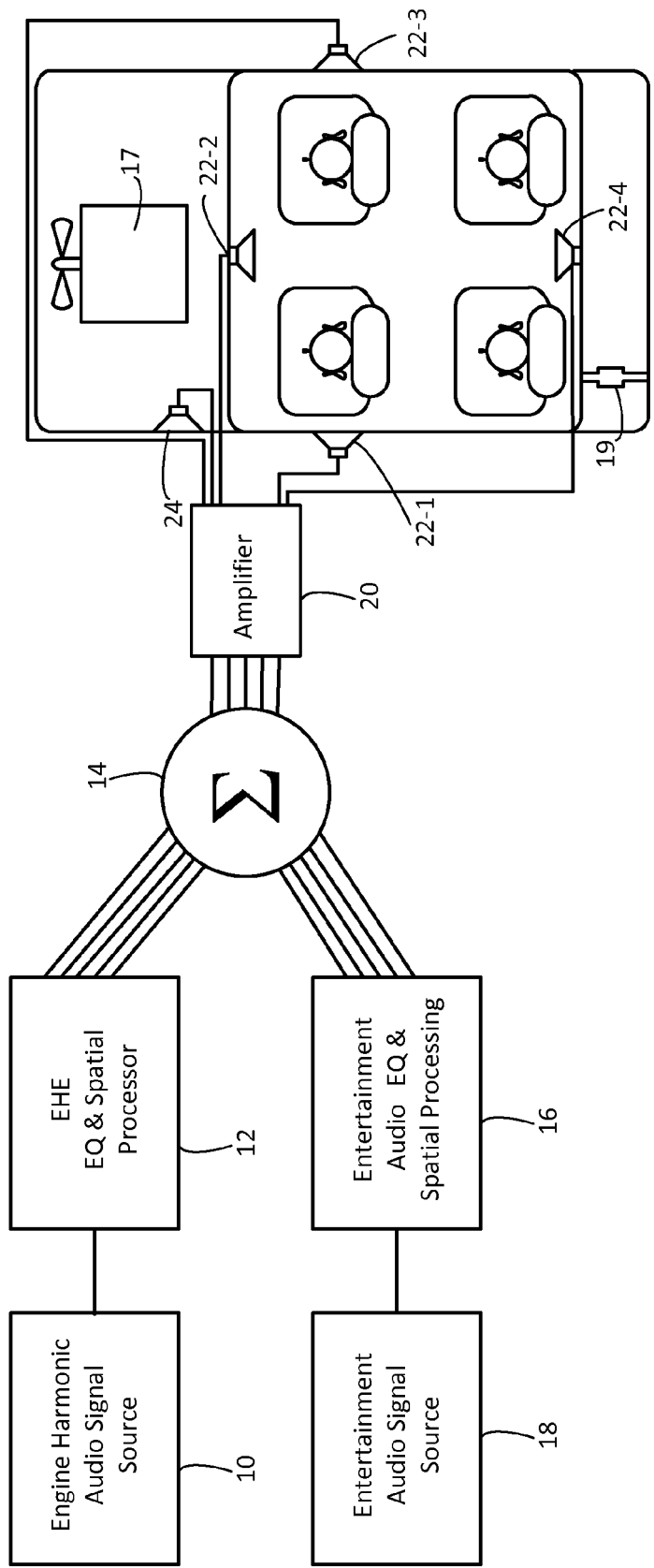
FIG. 1 is a block diagram of a vehicle including a vehicle engine sound enhancement system.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. One element may perform the activities of more than one block. Unless otherwise indicated, audio signals may be encoded and transmitted in either digital or analog form; conventional digital-to-analog or analog-to-digital converters may be omitted from the figures.

FIG. 1 is a block diagram of a vehicle including a vehicle engine sound enhancement system. An engine harmonic audio signal source 10 is operationally coupled to an engine harmonic enhancement (EHE) equalizer and spatial processor 12, which is in turn coupled to a summer 14. Also coupled to the summer 14 by an entertainment audio equalizer and spatial processor 16 is an entertainment audio signal source 18. The summer 14 is coupled through a multichannel amplifier 20 to a number of loudspeakers 22-1-22-4 positioned about the vehicle cabin, and in some implementations may be positioned, for example as loudspeaker 24 to radiate acoustic energy to the exterior of the vehicle. The operational coupling between the engine harmonic audio signal source 10 and the EHE EQ and spatial processor 12 is indicated by a single line. A more complete description of the operational relationship between the engine harmonic audio signal source 10 and the EHE EQ and spatial processor 12 is shown in subsequent figures and is described in more detail below. The couplings between the EHE equalizer and spatial processor 12, the entertainment audio equalizer and spatial processor 16, the summer 14, and the amplifier 20 may be multichannel, as indicated by the multiple lines. As stated above, signal lines may be implemented as discrete analog or digital signal lines, as a single discrete digital signal line with appropriate signal processing to process separate streams of audio signals, or as elements of a wireless communication system.

In operation, the entertainment audio signal source 18 and entertainment audio equalizer and spatial processor 16 may operate conventionally, to provide equalized and spatially processed audio entertainment to the occupants of the vehicle cabin. In some implementations, the entertainment audio signal source can include announcement audio signals, for navigation, warning signals, and the like. The EHE audio signal source provides signals representing synthetically created or recorded engine sounds of harmonic frequencies related to the engine speed, typically referenced in revolutions per minute (RPM). The EHE equalizer and spatial processor processes the EHE audio signals so that, when reproduced by the loudspeakers 22-1-22-4 and 24 they provide a desired sonic experience. For example, it may be desired for the sound corresponding to EHE audio signals to appear to come from either a front engine bay 17 or a rear exhaust pipe 19. The processed EHE audio signals and the processed entertainment audio signals are summed at summer 14, amplified by amplifier 20 and transduced to acoustic energy by the loudspeakers 22-1-22-4 and 24.

Figure 2:
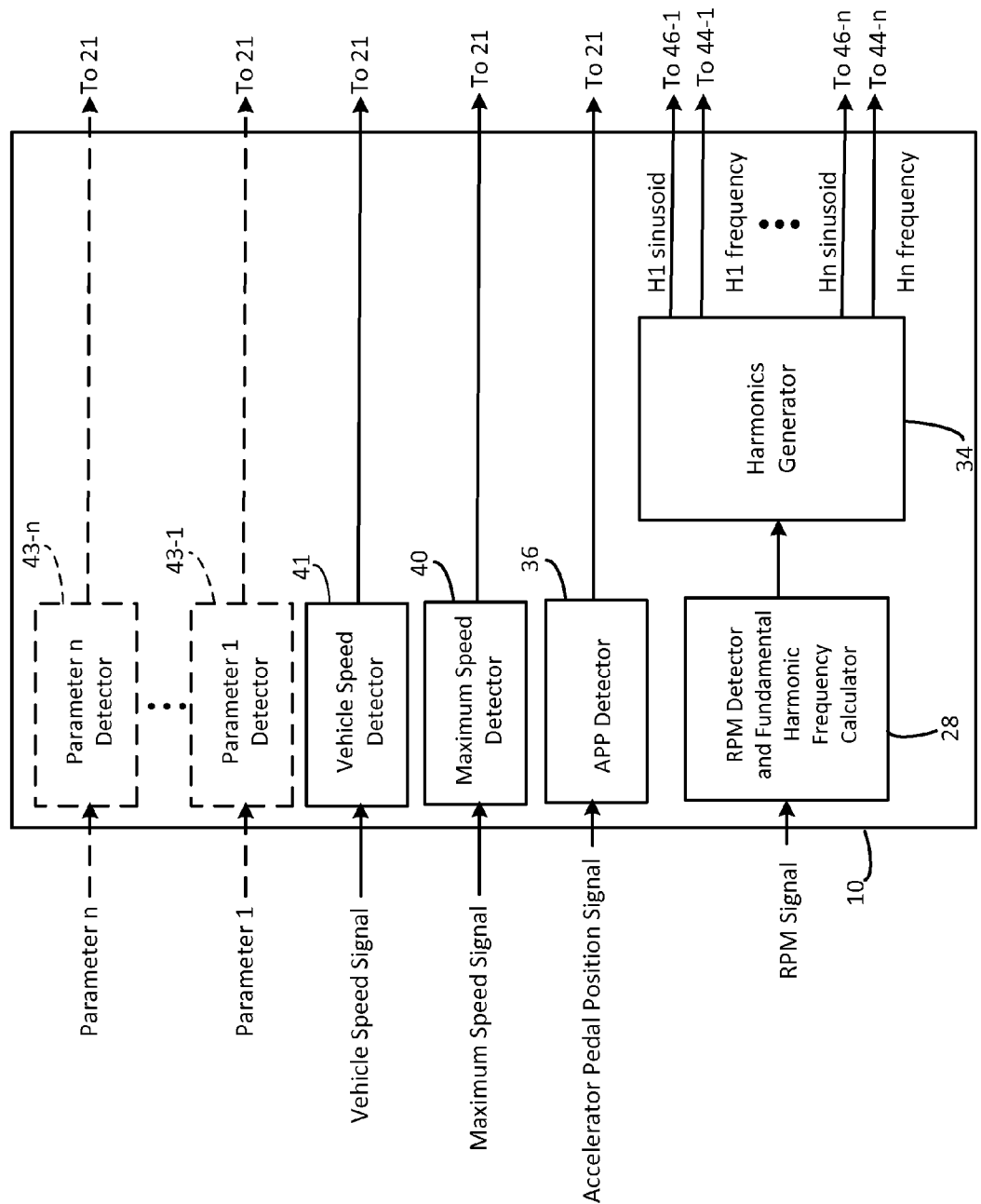
FIG. 2 is a block diagram of an engine harmonic audio signal source.

FIG. 2 is block diagram of the engine harmonic audio signal source 10, in greater detail. An RPM detector and fundamental frequency calculator 28 receives as input a signal indicative of the engine speed in RPM. The RPM detector and fundamental frequency calculator 28 is operationally coupled a harmonics generator 34. An accelerator pedal position detector 36 receives as input a signal indicative of an accelerator pedal position (APP). The engine harmonic audio signal source 10 also includes a maximum speed detector 40 that receives as input a signal indicative of a maximum speed, which is a vehicle speed limit set by a user (e.g., a vehicle operator) via a speed limiter; and a vehicle speed detector 41 that receives as input a signal indicative of an actual, measured vehicle speed. The APP, the set maximum speed, and the measured vehicle speed may be made available to the engine harmonic audio signal source 10 via a controller area network (CAN) bus.

In some cases, the engine harmonic audio signal source 10 may also include one or more additional parameter detectors 43-1-43-*n* for detecting one or more additional vehicle parameters such as a gear that the vehicle is operating in, a rate of change in engine RPM (ΔRPM), a driving mode that the vehicle is operating in (e.g., sport or luxury driving modes), etc.

Figure 3A:
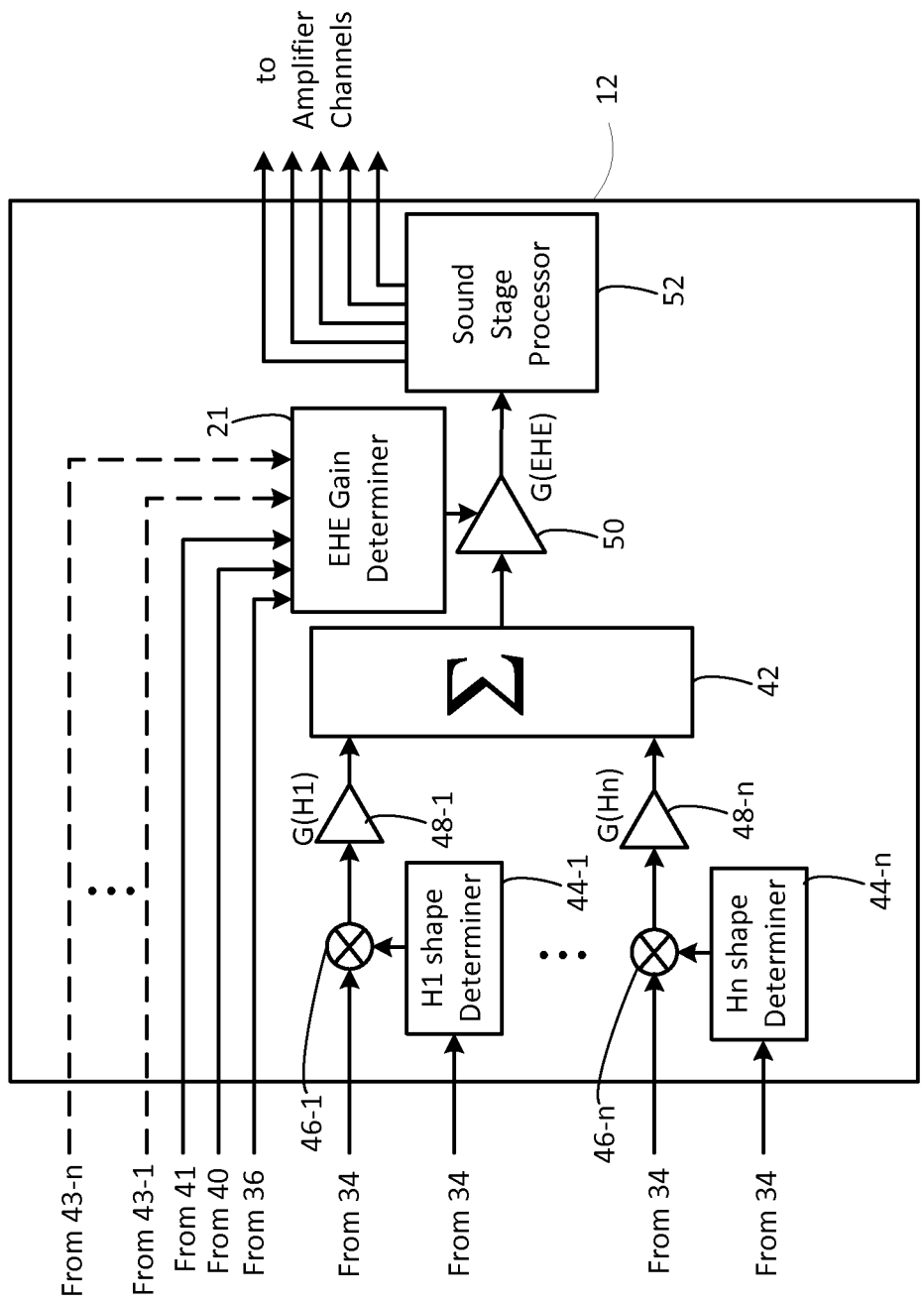
FIG. 3A is a block diagram of an engine harmonic enhancement equalizer (EHE EQ) and spatial processor.

FIG. 3A is a block diagram of an example of the EHE equalizer and spatial processor 12, in greater detail. An EHE gain determiner 21 is operationally coupled to receive input from the APP detector 36, the maximum speed detector 40, the vehicle speed detector 41, and, in some cases, one or more additional parameter detectors **43-1-43-*n*, of the engine harmonic audio signal source 10 of FIG. 2, and to output a signal to overall enhancement gain 50. Overall enhancement gain 50 is coupled to sound stage processor 52. H1 shape look up table (LUT) 44-1 . . . Hn shape LUT 44-*n* are operationally coupled to the harmonics generator 34 of the engine harmonic audio signal source 10 of FIG. 2. Summers 46-1 . . . 46-*n* are operationally coupled to corresponding harmonic shape LUTs 44-1 . . . 44-*n*, to the harmonics generator 34 of the engine harmonic audio signal source 10 of FIG. 2, and to a corresponding harmonic gain 48-1 . . . 48-*n*. Harmonic gains 48-1 . . . 48-*n* are operationally coupled to harmonics summer 42**.

The operation of the individual elements of FIGS. 2 and 3A will now be explained. The RPM signal that is input to the RPM detector and fundamental frequency calculator 28 determines the fundamental frequency of the engine harmonics and the engine load signal controls the overall sound level of the harmonic enhancement. The RPM signal can be an analog signal over a wire or a digital signal over a bus (GM-LAN, CAN, MOST, etc.). In one implementation, the RPM signal indicates a known number of pulses per engine revolution. If the RPM signal comes from an ignition module, the number of pulses per revolution (PPR) is usually equal to the number of engine cylinders which fire each revolution or half of the total number of active engine cylinders since only half of a conventional (four-stroke) engine's cylinders fire each revolution. For example, an ignition-based RPM signal from an 8 cylinder engine will have 4 PPR. If the RPM comes from a crankshaft sensor the number of pulses is equal to the number of equally-spaced teeth on the crankshaft position wheel, not including special teeth used to indicate crank position, typically to indicate the top dead center (TDC) position of the crankshaft.

The RPM detector and fundamental harmonic frequency calculator measures the time between successive RPM pulses, and computes the reciprocal to determine the fundamental engine harmonic frequency. To reject TDC pulses or errors in RPM detection, the detector may replace a new pulse period with, for example, a previous pulse period if the new pulse period is greater than a predetermined tolerance (e.g. +/−25%) of the previously accepted pulse period.

The APP detector 36 of FIG. 2 determines the inherent engine sound level to properly balance the sound enhancement. A signal representing accelerator pedal position (APP) is well suited for controlling sound enhancement for at least two reasons. First, the APP generally correlates well with the engine load. Second, using the APP as a control parameter can allow the engine sound enhancement system to create the sensation that the vehicle is more responsive. More specifically, there is often a delay (e.g., 300 ms delay) between when the accelerator pedal is pressed and when the engine state (torque) changes. An engine sound enhancement system can use the APP to produce a sound enhancement before the engine state changes, thereby giving the vehicle operator the perception that the engine responded with little or no delay. The APP signal is typically available from the vehicle's Engine Control Unit (ECU).

The APP detector 36 may convert the APP signal from a native data form to a form more useful to the engine sound enhancement system. For example, the APP detector 36 may convert the APP measurement to an index; for example, the maximum APP may be designated as 100 and the APP may be expressed as a number from 1-100. Likewise, the maximum speed detector 40 and the vehicle speed detector 41 may convert the maximum speed and vehicle speed signals from a native form into a form more useful by the engine sound enhancement system.

The harmonics generator 34 of FIG. 2 outputs two parameters for each enhanced engine harmonic (which could be a non-integer harmonic). First, it computes the frequency for each enhanced harmonic by multiplying the fundamental engine rotation frequency by the order of each enhanced engine harmonic. Next, it converts the fundamental frequency into an index to the harmonic shape Look-Up Table (LUT).

The harmonic shape LUTs **44-1-44-*n* of FIG. 3A** are frequency-to-gain look-up tables (LUTs) which enable the sound level of each enhanced harmonic to be frequency dependent. This shape control outputs a gain which adjusts the harmonic enhancement level. The resulting enhancement, output through the speakers and acoustically summed with the inherent harmonic sound level, produces a sound level which matches a desired target. To achieve this goal, the look-up table must account for the inherent harmonic level, the target harmonic level, and the transfer function of the audio system, all ideally measured at the occupant's ears. The look-up tables should have enough frequency resolution such that sound level values interpolated between adjacent frequency indices satisfy desired enhancement requirements and not cause enhancement artifacts due to too-coarse frequency spacing. For computational efficiency all the harmonic shape LUT's may use the same frequency indices, usually based on the first harmonic of the engine RPM. If so, then all shape LUT's will have the same number of entries. Assuming this is the case, the highest order EHE harmonic will dictate the required number of LUT entries because it will cover the greatest range of frequencies for a given RPM range. For example, a first order harmonic will cover a 90 Hz range (10 to 100) for a RPM range from 600 to 6000; while a tenth order harmonic will cover 900 Hz for the same RPM range.

The harmonic gains 48-1 . . . **48-*n* apply individual harmonic specific gains to each of the harmonics, based on input from the harmonic shape LUT's 44-1-44-*n* and the instantaneous values of the sinusoids for each of the harmonic frequencies determined by the harmonics generator 34**.

The EHE gain determiner 21 determines the amount of gain (EHE gain) to be applied by the overall enhancement gain 50. The EHE gain determiner may use the accelerator pedal position measurement (e.g., as an estimate of engine load), the maximum vehicle speed, and the actual vehicle speed to determine the EHE gain that is to be applied by the overall enhancement gain 50. In that regard, the EHE gain determiner 21 may slowly adjust the EHE gain as the actual, measured vehicle speed approaches a user set maximum speed. That is, the EHE gain determiner 21 may slowly reduce the gain as the actual, measured vehicle speed approaches a user set maximum speed, and such that the gain is zero (no enhancement) when the vehicle reaches the set maximum speed. Such functionality can help to prevent the engine sound enhancement system from changing the perceived engine sound when the vehicle operator presses down on the accelerator pedal while the vehicle's speed limiter is preventing a change in the engine state.

Additionally, the EHE gain determiner may also smooth the gain so that the sound variation is natural, and undistorted, similar to the sound variation in time of a mechanical system.

The overall enhancement gain 50 can change the overall sound level of individual harmonics without changing the frequency-dependent "shape" of the enhancement. The overall enhancement gain 50 outputs a summed and scaled EHE audio signal.

Figure 3B:
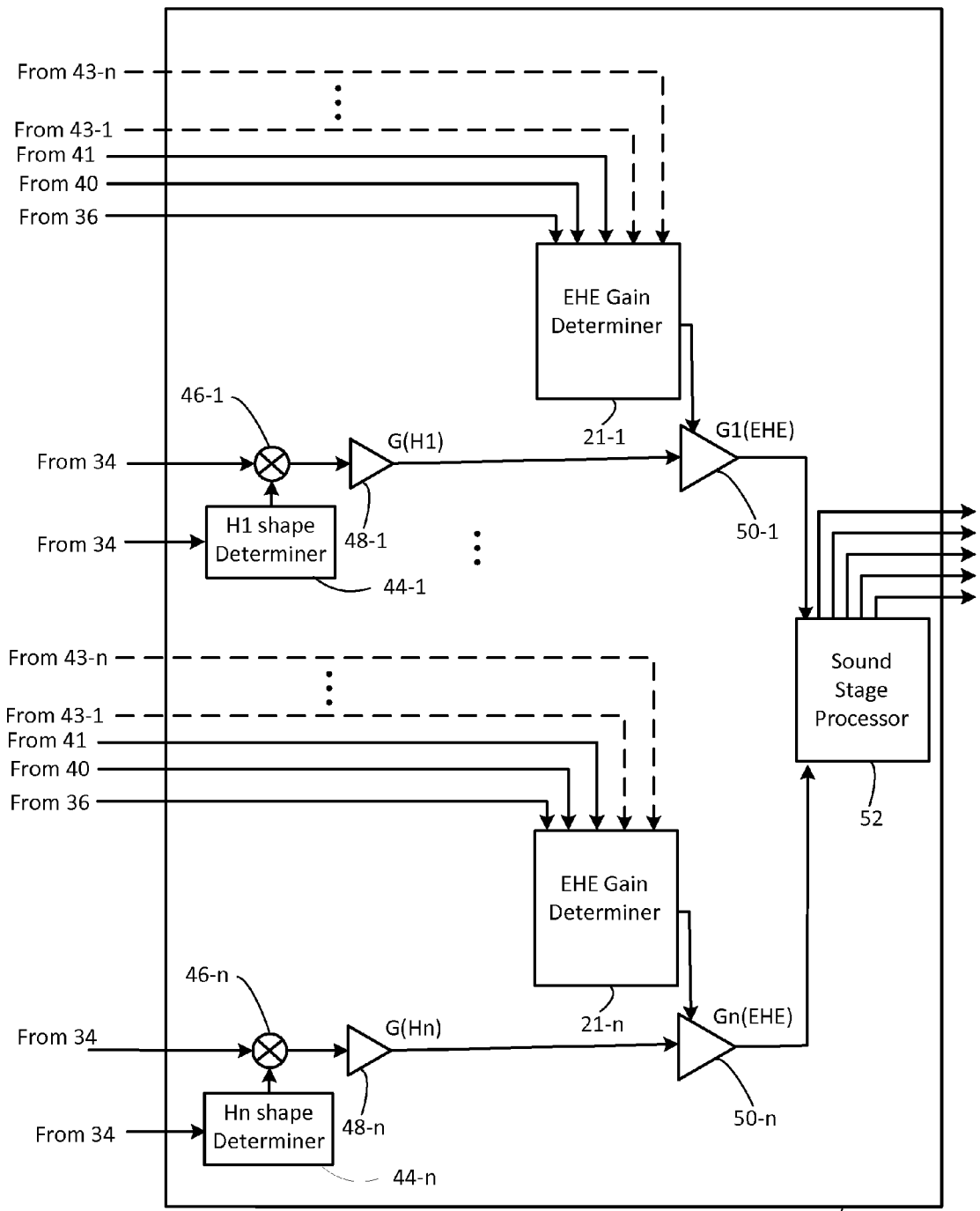
FIG. 3B is a block diagram of another EHE EQ and spatial processor.

FIG. 3B illustrates an alternative configuration of the engine harmonic enhancement (EHE) equalizer and special processor 12. The EHE equalizer and special processor 12 of FIG. 3B does not have the harmonics summer 42, the overall enhancement gain 50 or the EHE gain determiner 21 of FIG. 3A. Instead, the EHE equalizer and special processor 12 of FIG. 3B has separate gains 50-1-50-$n$, and separate EHE gain determiners 21-1-21-$n$, one for each harmonic. Each of the EHE gain determiners 21-1 . . . 21-$n$ receives inputs from the APP detector 36, the maximum speed detector 40, and the vehicle speed detector 41. The gain for each harmonic can be zero (indicating that there is no enhancement at that harmonic) or unity.

The EHE equalizer and special processor 12 of FIG. 3B permits the accelerator pedal position measurement, the maximum vehicle speed, the actual vehicle speed, and, in some cases, one or more additional vehicle parameters from parameter detectors 43-1-43-$n$, to be used to determine respective EHE gains for each harmonic, thereby to affect each harmonic differently.

Figure 4A:
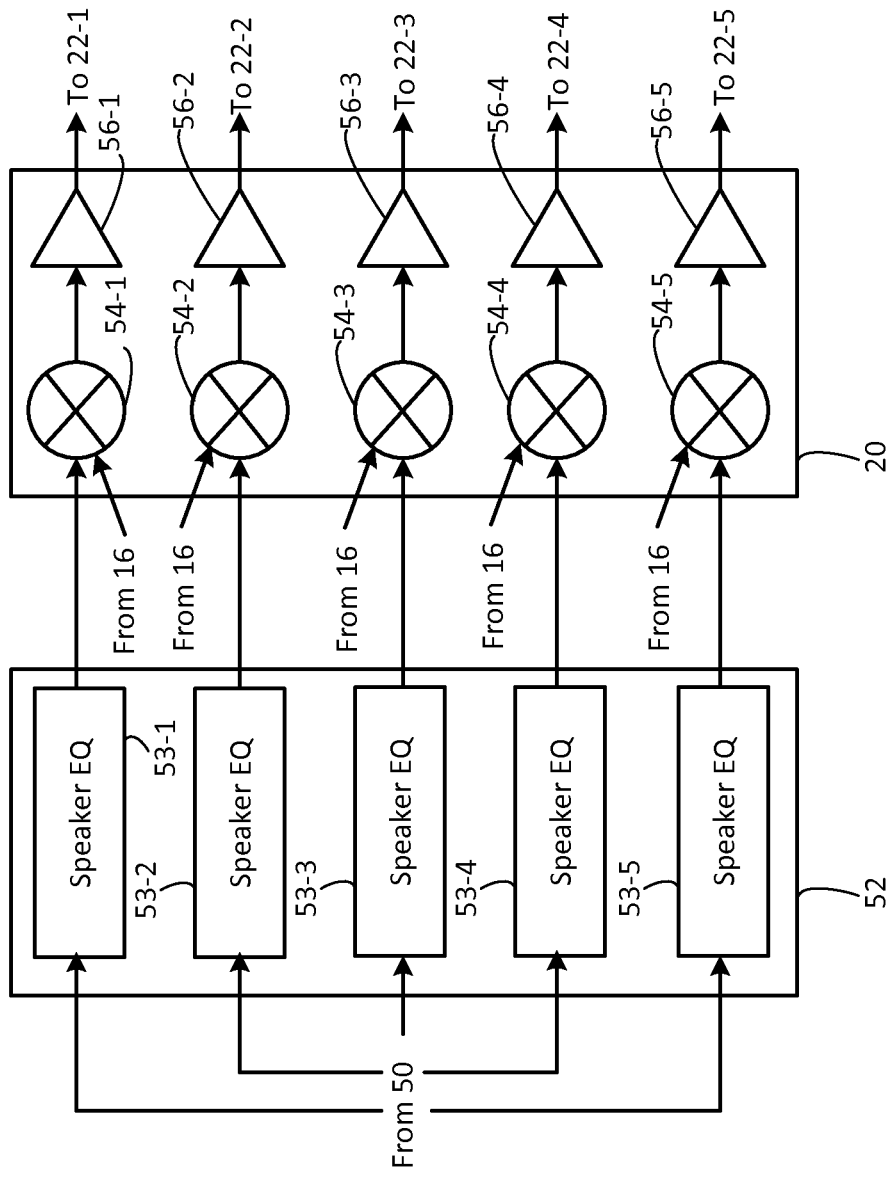
FIGS. 4A and 4B are block diagrams of a sound stage processor and an amplifier.

A sound stage processor 52 and the amplifier 20 are shown in more detail in FIG. 4A. The sound stage processor 52 includes a plurality of equalizers (EQs) 53-1-53-5, one for each speaker. The amplifier 20 includes a plurality of summers 54-1-54-5 and a plurality of channel amplifiers 56-1-56-5 both one for each speaker. In some examples the number of equalizers may be greater or less than the actual number of speakers, and equalize the signal according to a set of ideal speaker locations. The equalized outputs are re mixed to match the actual number of speakers, either by an additional stage of the sound stage processor 52 or by processing within the amplifier 20.

In operation, each of the speaker EQs 53-1-53-5 applies an equalization, which can include amplitude (which can include turning off the speaker) and phase adjustment and application of delay to the signal from the overall enhancement gain 50. The individually equalized signals from the speaker EQs 53-1-53-5 are summed in the amplifier at the summers 54-1-54-5 with the signals from the entertainment audio system intended for the corresponding speaker, and the summed signals are amplified by the channel amplifiers 56-1-56-5. The amplified channels signals are then transmitted to the loudspeakers 22-1-22-4 and 24, which transduce the audio signals to sound.

Figure 4B:
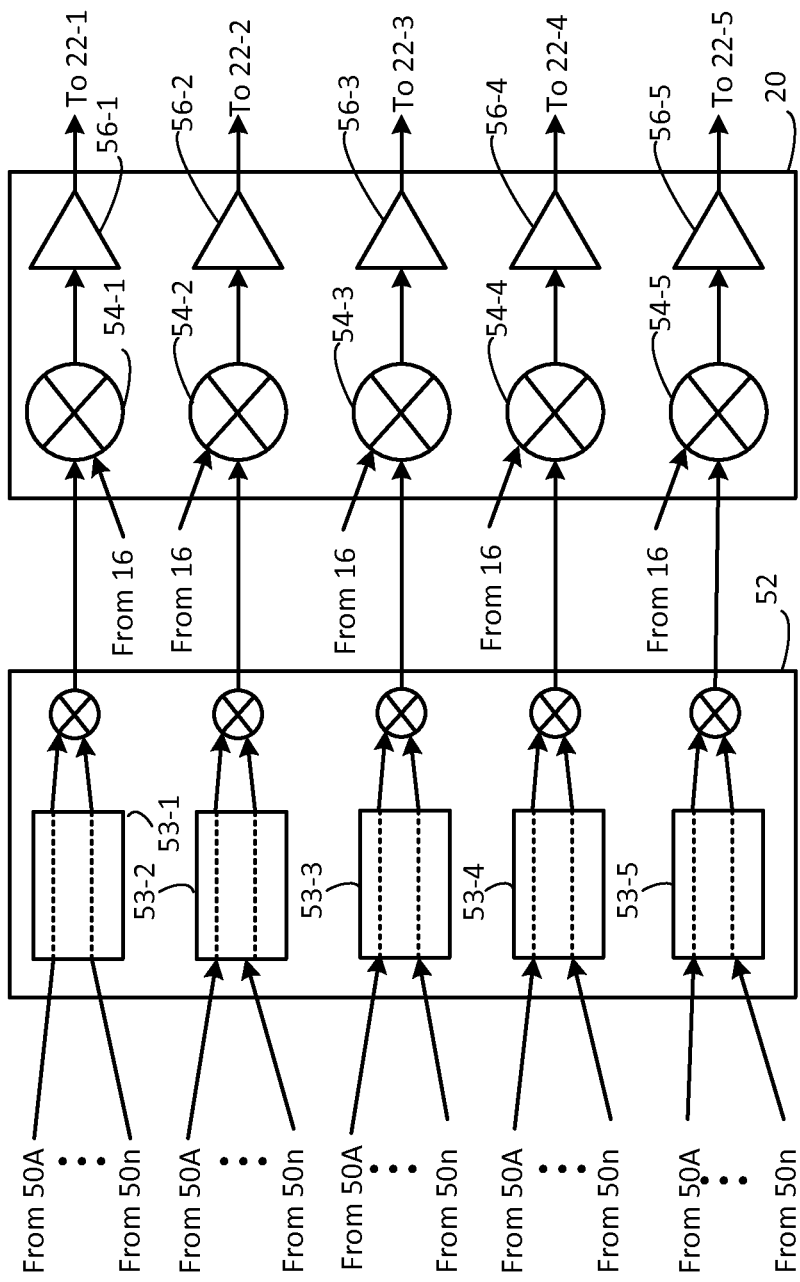

FIG. 4B shows a sound stage processor 52 for use in the EHE equalizer and special processor 12 of FIG. 3B. The sound stage processor 52 of FIG. 4B processes the summed-and-scaled EHE signals from overall enhancement gains 50-1-50-$n$ to determine an acoustic imaging for each of the harmonics. The sound stage processor separately processes each of the EHE signals from overall enhancement gains 50-1-50-$n$ through separate audio equalization filters 53-1-53-5 for each loudspeaker 22-1-22-4 and 24 of FIG. 1. Each equalization filter 53-1-53-5 may apply a different equalization to the EHE signals from the overall enhancement gains 50-1-50-$n$, as represented by the separate paths in dashed lines through the equalization filters 53-1-53-5. The equalization paths are summed after equalization and provided to the amplifier 20. The audio equalization filters control the magnitude and phase response as a function of frequency, and delays. Besides the traditional entertainment audio equalization and spatial imaging tuning techniques, sound stage processor 52 may also adjust the gain and even turn off certain EHE speakers over certain frequency ranges to achieve the desired sonic imaging. Because EHE imaging requirements are usually different from that for entertainment audio at least some of the EHE equalization components may be separate from the entertainment audio equalization. The sound stage processor 52 operates on the EHE signal to achieve not only the desired amplitudes of the desired harmonics, but also to achieve the desired apparent source for each of the sets of engine harmonics. For example, the source of the higher end harmonics could be the engine bay 17 and the source of the lower order harmonics could be the muffler 19 of FIG. 1.

Figure 5:
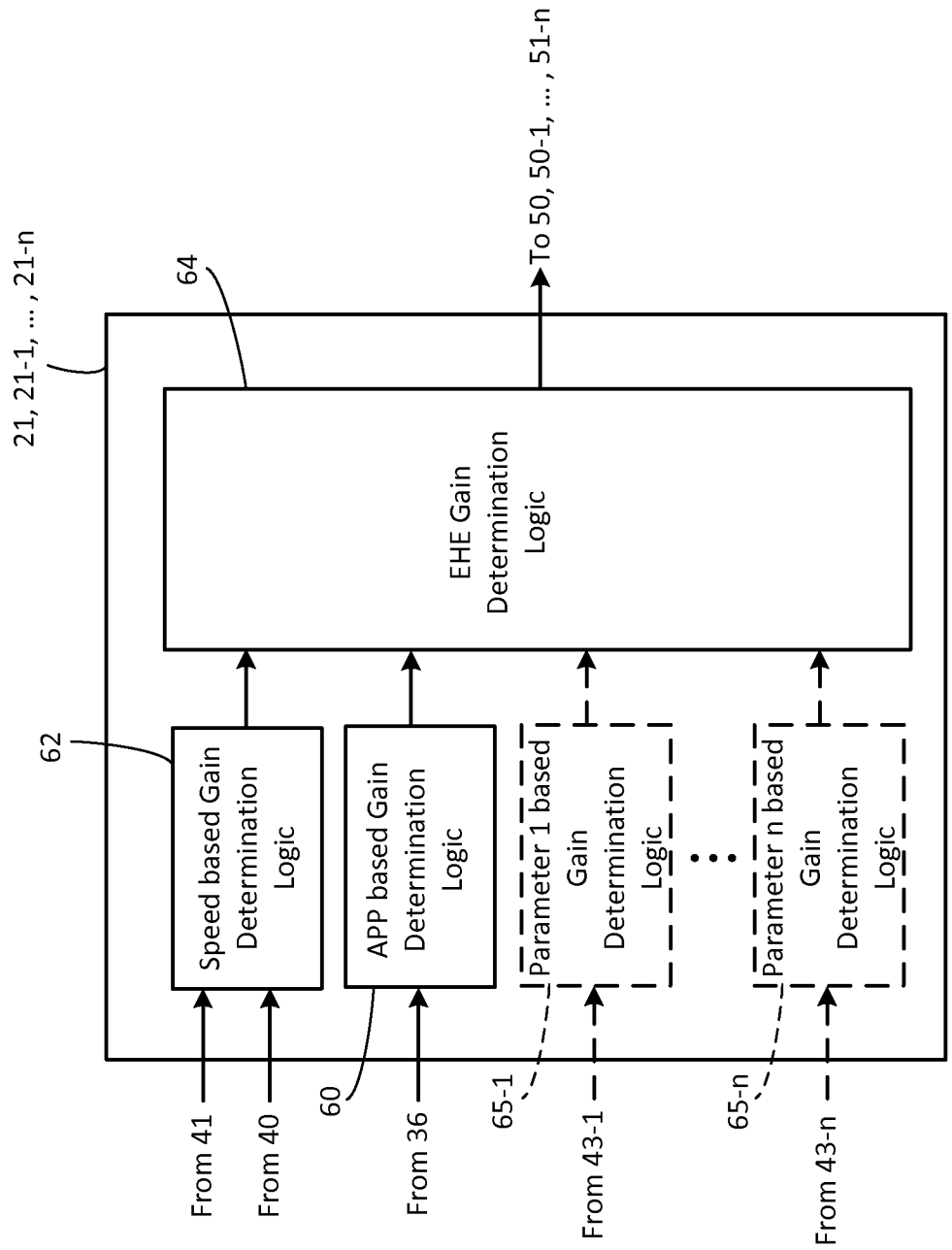
FIG. 5 is a block diagram of an engine harmonic enhancement (EHE) gain determiner.

FIG. 5 shows an EHE gain determiner that can be used for element 21 of FIG. 3A or any of elements 21-1-21-$n$ of FIG. 3B. The EHE gain determiner of FIG. 5 includes APP based gain determination logic 60 that receives input indicative of an accelerator pedal position from the APP detector 36 and determines an APP based gain ($g_{app}$) as a function of the accelerator pedal position. The APP based gain ($g_{app}$) can be determined according to:

$$g_{app} = f_1(\text{app}) \quad (1)$$

Where the function $f_1$ can be defined during a tuning process. The function $f_1$ may, for example, be implemented as an accelerator pedal position (APP)-to-gain look-up table, which converts the input from the APP detector 36 to an enhancement gain (a/k/a engine APP based gain ($g_{app}$)). In implementations that utilize a separate EHE gain determiner 21-1-21-$n$ for each harmonic, such as in FIG. 3B, the function $f_1$ may be different for different ones of the EHE gain determiners 21-1-21-$n$.

The EHE gain determiner of FIG. 5 also includes speed based gain determination logic 62. The speed based gain determination logic 62 receives input indicative of the set maximum speed from the maximum speed detector 40 and input indicative of the actual, measured vehicle speed from the vehicle speed detector 41 and determines a speed based gain ($g_{\Delta V}$) which varies as a function of a difference between the set maximum speed and the measured vehicle speed. This can allow the overall sound enhancement to be adjusted based on the proximity of the actual, measured vehicle speed to the set maximum speed, which can be particularly beneficial when the APP is utilized as a control input for determining the EHE gain.

In one example, the control parameter used by the speed based gain determination logic 62 in determining the speed based gain ($g_{\Delta V}$) is the norm of the difference between the set maximum speed and the actual, measured vehicle speed. The norm ($\Delta V$) of the difference between the set maximum speed and the vehicle speed is defined by:

$$\Delta V = \frac{V_{max} - V_{measured}}{V_{max}} \quad (2)$$

where, $V_{max}$ is the maximum speed (e.g., as set by the vehicle operator via a speed limiter) as provided from the maximum speed detector 40 (FIG. 2); and $V_{measured}$ is the actual, measured vehicle speed as provided from the vehicle speed detector 41 (FIG. 2).

The speed based gain ($g_{\Delta V}$) can be determined according to:

$$g_{\Delta V} = f_2(\Delta V) \quad (3)$$

Where the function $f_2$ can be defined during a tuning process. The function $f_2$ may, for example, be implemented as norm ($\Delta V$)-to-gain look-up table containing the desired gain values for a set of normed speed difference.

An exemplary look-up table is illustrated in Table 1 below.

TABLE 1

| $\Delta V$ | Speed Based Gain ($g_{\Delta V}$) |
|---|---|
| 1 | 1 |
| 0.25 | 1 |
| 0.2 | 0.7 |
| 0.1 | 0.25 |
| 0.05 | 0.125 |
| 0 | 0 |

Notably, the speed based gain ($g_{\Delta V}$) increases as the norm of the difference between the set speed limit and the measured vehicle speed increases. The speed based gain ($g_{\Delta V}$) decreases as the norm of the difference between the set maximum speed and the measured vehicle speed decreases, and, such that, a speed based gain of 0 is provided when the measured vehicle speed is equal to the set maximum speed. In implementations that utilize a separate EHE gain determiner 21-1-21-*n* for each harmonic, such as in FIG. 3B, the norm ($\Delta V$)-to-gain look-up table may be different for different ones of the EHE gain determiners 21-1-21-*n*.

The EHE gain determiner 21, 21-1-21-*n* of FIG. 5 also includes EHE gain determination logic 64. The EHE gain determination logic 64 receives input indicative of the APP based gain ($g_{app}$) from the APP based gain determination logic 60, and input indicative of the speed based gain ($g_{\Delta V}$) from the speed based gain determination logic 62 and determines an EHE gain ($g_{EHE}$) that is to be applied by the associated gain element 50, 50-1-50-*n*. Taking the speed based gain ($g_{\Delta V}$) into account when determining the EHE gain ($g_{EHE}$) allows the overall sound enhancement to be adjusted based on the proximity of the actual, measured vehicle speed to the set maximum speed.

The EHE gain determination logic 64 can determine the EHE gain ($g_{EHE}$) according to:

$$g_{EHE} = G \cdot g_{app} \cdot g_{\Delta V} = G \cdot f_1(\text{app}) \cdot f_2(\Delta V) \quad (4)$$

Where G is the product of any additional gains other than the APP based gain ($g_{app}$) and the speed based gain ($g_{\Delta V}$). For example, the EHE gain determiner 21, 21-1-21-*n* may include additional vehicle parameter based gain determination logic 65-1-65-*n* that, in response to input received from one or more additional parameter detectors (43-1-43-*n*, FIG. 2), determines one or more additional gains such as gear based gain that varies as a function of the gear the vehicle is operating in, a $\Delta$RPM based gain that varies as a function the rate of change of the engine RPM, a driving mode gain that varies as a function of a driving mode that the vehicle is operating in, etc. Thus, the EHE gain is the product of plural gains, most notably the APP based gain ($g_{app}$) and the speed based gain ($g_{\Delta V}$). In some instances, the APP based gain ($g_{app}$) and the speed based gain ($g_{\Delta V}$) may be the only gains taken into consideration by the EHE gain determination logic 64 when determining the EHE gain, in which case G would equal 1.

Since the speed based gain ($g_{\Delta V}$) decreases toward zero as the norm of the difference between the set maximum speed and the measured vehicle speed decreases, the EHE gain will be slowly reduced toward zero as the vehicle speed gets close to the speed limit; i.e., as $\Delta V$ approaches 0. The EHE slowly decreases until the vehicle reaches the set maximum speed, at which point the speed based gain ($g_{\Delta V}$) is set to zero (which sets $g_{EHE}$ to zero), thereby effectively turning off any enhancement.

As a result, when the vehicle is traveling at the set maximum speed with the speed limiter engaged, the engine sound enhancement system will not produce an engine sound in response to the vehicle operator pressing down on the accelerator pedal. Consequently, under those circumstances, the engine sound enhancement system will not produce an engine sound that would give the vehicle operator the false perception that the vehicle is accelerating while the speed limiter is, in fact, preventing acceleration.

Figure 6:
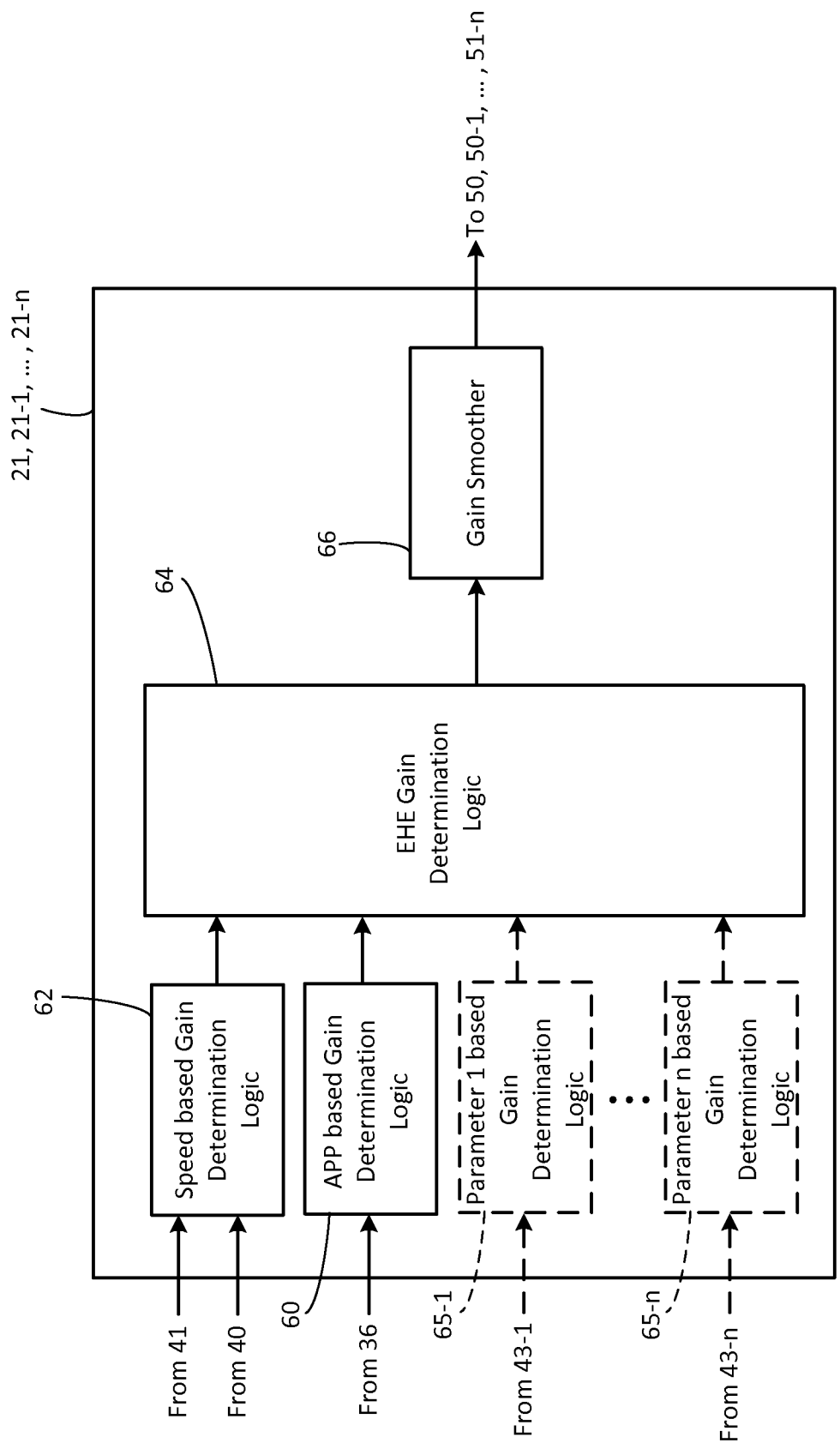
FIG. 6 is a block diagram of another engine harmonic enhancement (EHE) gain determiner.

FIG. 6 illustrates another implementation of an EHE gain determiner that can be used for element 21 of FIG. 3A or any of elements 21-1-21-*n* of FIG. 3B. In addition to the APP based gain determination logic 60, the speed based gain determination logic 62, and the EHE gain determination logic 64, which function as described above with respect to FIG. 5, the EHE gain determiner of FIG. 6 also includes a gain smoother 66. The gain smoother 66 receives as input the EHE gain from the EHE gain determination logic 62. The gain smoother 66 smooths the EHE gain, which may consist of a stream of discrete gain values that vary as a function of the APP and the norm $\Delta V$, to reduce the possibility of abrupt changes in the overall enhancement gain applied to the harmonics via the gain element 50, 50-1-50-*n*. The smoothing may take the form of slewing, windowed averaging, low pass filtering, a non-linear smoothing technique, a time-varying smoothing technique, or others. In one implementation, the gain smoother 66 is a low pass filter, which can be a single pole low pass filter or a variable pole low pass filter.

Figure 7:
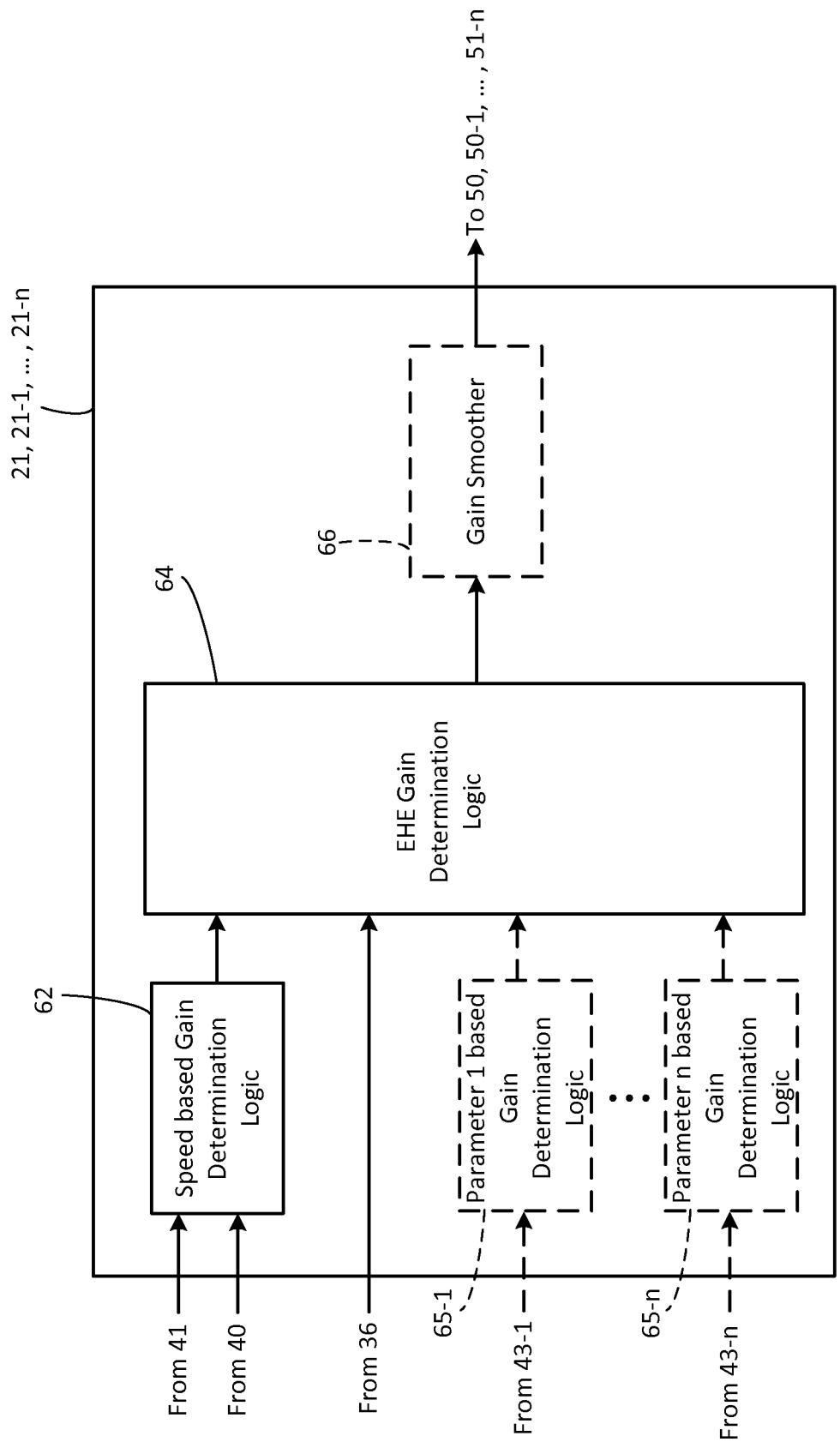
FIG. 7 is a block diagram of yet another implementation of an engine harmonic enhancement (EHE) gain determiner.

FIG. 7 Illustrates yet another implementation of an EHE gain determiner that can be used for element 21 of FIG. 3A or any of elements 21-1-21-*n* of FIG. 3B. Unlike the EHE gain determiner of FIG. 5, the EHE gain determiner of FIG. 7 does not include APP based gain determination logic. Rather, in the configuration of FIG. 7, the EHE gain determination logic 64 receives the input indicative of the accelerator pedal position from the APP detector 36, input indicative of the norm based gain ($g_{\Delta V}$) from the norm based gain determination logic 62, and, possibly, additional input from additional gain determination logic (as discussed above) and determines the EHE gain according to:

$$g_{EHE} = G \cdot f_1(\text{app} \cdot f_2(\Delta V)) \quad (5)$$

The function $f_1$ may, for example, be implemented as a look-up table containing the desired gain values mapped to the product of the accelerator pedal position (APP) and the speed based gain ($g_{\Delta V}$). As in equation 4, above, G in equation 5 is again the product of any additional gains that might be considered in the determination of the EHE gain. In implementations that utilize a separate EHE gain determiner 21-1-21-*n* for each harmonic, such as in FIG. 3B, the function $f_1$ and/or function $f_2$ may be different for different ones of the EHE gain determiners 21-1-21-*n*.

The EHE gain determiner of FIG. 7 may optionally include gain smoother 66, such as described above, for smoothing the EHE gain from the EHE gain determination logic 64.

In the case of the EHE gain determiner of FIG. 5, which determines the EHE gain according to equation 4, the EHE gain will be forced to zero when the vehicle speed gets close to the set maximum speed, regardless of how the APP based gain was tuned. An advantage of that configuration is that the two gains $f_1(.)$ and $f_2(.)$ are independent, enabling an easier, less risky tuning.

In other implementations, if the APP is desired as a control input, the rate of change of RPM (ΔRPM) can be used to reduce the EHE gain ($g_{EHE}$) when the RPM is fairly constant. When the vehicle approaches the speed at which the speed limiter is set (i.e., the set maximum speed) it will slowly decrease the acceleration to zero, and the RPM will be constant.

A number of implementations have been described. Nevertheless, it will be understood that additional modifications may be made without departing from the scope of the inventive concepts described herein, and, accordingly, other embodiments are within the scope of the following claims.

What is claimed is:

1. A method comprising:
providing a fundamental frequency corresponding to the RPM of an engine of a vehicle;
determining a plurality of harmonics of the fundamental frequency;
determining a target shape of the plurality of harmonics, the target shape comprising, for each of the harmonics of the plurality of the harmonics, a gain value as a function of the RPM of the engine;
determining an accelerator pedal position (APP) based gain comprising a gain value as a function of an accelerator pedal position;
determining a speed based gain comprising a gain value as a function of a difference between a set maximum speed of the vehicle and a measured vehicle speed of the vehicle; and
combining the plurality of harmonics, the target shape of the plurality of harmonics, the APP based gain, and the speed based gain to produce a set of engine harmonic enhancement signals.

2. The method of claim 1, wherein the determining an APP based gain comprises separately determining an APP based gain for each harmonic.

3. The method of claim 1, wherein the determining a speed based gain comprises separately determining a speed based gain for each harmonic.

4. The method of claim 1, wherein determining a speed based gain comprises determining a norm of the difference between the set speed limit and the measured vehicle speed.

5. The method of claim 4, wherein the norm of the difference between the set speed limit and the measured vehicle speed is determined according to:

$$\Delta V = \frac{V_{max} - V_{measured}}{V_{max}}$$

where,
ΔV is the norm of the difference between the set speed limit and the measured vehicle speed;
$V_{max}$ is the set maximum vehicle speed; and
$V_{measured}$ is the measured vehicle speed.

6. The method of claim 4, wherein the speed based gain increases as the norm of the difference between the set maximum speed and the measured vehicle speed increases.

7. The method of claim 1, wherein the speed based gain increases as the difference between the set maximum speed and the measured vehicle speed increases.

8. The method claim 1, wherein the speed based gain decreases as the difference between the set maximum speed and the measured vehicle speed decreases, and, such that, no engine harmonic enhancement is provided when the measured vehicle speed is equal to the set maximum speed.

9. The method of claim 1, further comprising, in a vehicle sound system, transducing the engine harmonic enhancement signals to acoustic energy thereby to produce an engine sound within a passenger cabin of a vehicle.

10. A system comprising:
circuitry for providing a fundamental frequency corresponding to the RPM of an engine of a vehicle;
circuitry for determining a plurality of harmonics of the fundamental frequency;
circuitry for determining a target shape of the plurality of harmonics, the target shape comprising, for each of the harmonics of the plurality of the harmonics, a gain value as a function of the RPM of the engine;
circuitry for determining an accelerator pedal position (APP) based gain comprising a gain value as a function of an accelerator pedal position;
circuitry for determining a speed based gain comprising a gain value as a function of a difference between a set maximum speed of the vehicle and a measured vehicle speed of the vehicle; and
circuitry for combining the plurality of harmonics, the target shape of the plurality of harmonics, the engine harmonic enhancement gain, and the engine harmonic enhancement modification gain to produce a set of harmonic enhancement signals.

11. The system of claim 10, wherein the circuitry for determining an APP based gain comprises circuitry for separately determining an APP based gain for each harmonic.

12. The system of claim 10, wherein the circuitry for determining a speed based gain comprises circuitry for separately determining a speed based gain for each harmonic.

13. The system of claim 10, wherein the circuitry for determining the speed based gain is configured to determine the speed based gain by determining a norm of the difference between the set maximum speed and the measured vehicle speed, and mapping the norm to a gain value.

14. The system of claim 13, wherein the norm of the difference between the set maximum speed and the measured vehicle speed is determined according to:

$$\Delta V = \frac{V_{max} - V_{measured}}{V_{max}}$$

where,
ΔV is the norm of the difference between the set speed limit and the measured vehicle speed;
$V_{max}$ is the set maximum speed; and
$V_{measured}$ is the measured vehicle speed.

15. The system of claim 13, wherein the speed based gain increases as the norm of the difference between the set maximum speed and the measured vehicle speed increases.

16. The system of claim 10, wherein the speed based gain increases as the difference between the set maximum speed and the measured vehicle speed increases.

17. The system claim 10, wherein the speed based gain decreases as the difference between the set maximum speed and the measured vehicle speed decreases, and, such that, no engine harmonic enhancement is provided when the measured vehicle speed is equal to the set maximum speed.

18. A method comprising:
providing a fundamental frequency corresponding to the RPM of an engine of a vehicle;

determining a plurality of harmonics of the fundamental frequency;

determining a target shape of the plurality of harmonics, the target shape comprising, for each of the harmonics of the plurality of the harmonics, a gain value as a function of the RPM of the engine;

determining a speed based gain comprising a gain value as a function of a difference between a set maximum speed of the vehicle and a measured vehicle speed of the vehicle;

determining an engine harmonic enhancement (EHE) gain comprising a gain value as a function of an accelerator pedal position and the speed based gain;

combining the plurality of harmonics, the target shape of the plurality of harmonics, and the EHE gain to produce a set of engine harmonic enhancement signals.

19. The method of claim 18, further comprising determining at least one additional vehicle parameter based gain comprising a gain value as a function of an additional vehicle parameter, and wherein the EHE based gain comprises a gain value as a function of the accelerator pedal position, the speed based gain, and the additional vehicle parameter based gain.

20. The method of claim 19, wherein the additional vehicle parameter based gain is selected from the group consisting of a gear that the vehicle is operating in, a rate of change in engine RPM ($\Delta$RPM), and a driving mode that the vehicle is operating in.

* * * * *